(12) United States Patent
Vaughan

(10) Patent No.: US 7,243,669 B2
(45) Date of Patent: Jul. 17, 2007

(54) FLOAT-RESPONSIVE VALVE WITH PREMATURE CLOSURE PREVENTION

(75) Inventor: Don Douglas Vaughan, Waunakee, WI (US)

(73) Assignee: Clack Corporation, Windsor, WI (US)

( * ) Notice: Subject to any disclaimer, the term of this patent is extended or adjusted under 35 U.S.C. 154(b) by 514 days.

(21) Appl. No.: 10/803,499

(22) Filed: Mar. 18, 2004

(65) Prior Publication Data

US 2004/0182760 A1    Sep. 23, 2004

Related U.S. Application Data

(60) Provisional application No. 60/456,126, filed on Mar. 19, 2003.

(51) Int. Cl.
*F16K 33/00*     (2006.01)
(52) U.S. Cl. ............... 137/1; 137/448; 137/409; 137/430; 210/123; 210/190
(58) Field of Classification Search ............... 137/448, 137/485, 409, 430, 1; 210/123, 190
See application file for complete search history.

(56) References Cited

U.S. PATENT DOCUMENTS 3,823,425 A * 7/1974 Coffman ................ 4/325
4,336,134 A    6/1982 Prior
4,426,294 A    1/1984 Seal
4,695,375 A * 9/1987 Tyler ................ 210/110
5,075,907 A * 12/1991 Harris ................ 4/325
6,776,901 B1 * 8/2004 Vaughan et al. ............ 210/190

* cited by examiner

*Primary Examiner*—Kevin Lee
(74) *Attorney, Agent, or Firm*—Boyle Fredrickson Newholm Stein & Gratz S.C.

(57) ABSTRACT

A float-responsive valve includes a valve actuator that is selectively responsive to operation of a float to move from a first position to a second position in which the valve actuator holds the valve element in its open position. When the valve actuator is in the second position thereof, fluid pressure that would otherwise tend to force the valve element toward its seat is essentially incapable of closing the valve element. Preferably, a force vector applied through a flapper-type valve actuator forms an essentially nonnegative, more preferably generally collinear, angle with a bisector line passing through a pivot axis of the valve actuator and a primary contact point between the valve actuator and the flapper.

29 Claims, 4 Drawing Sheets

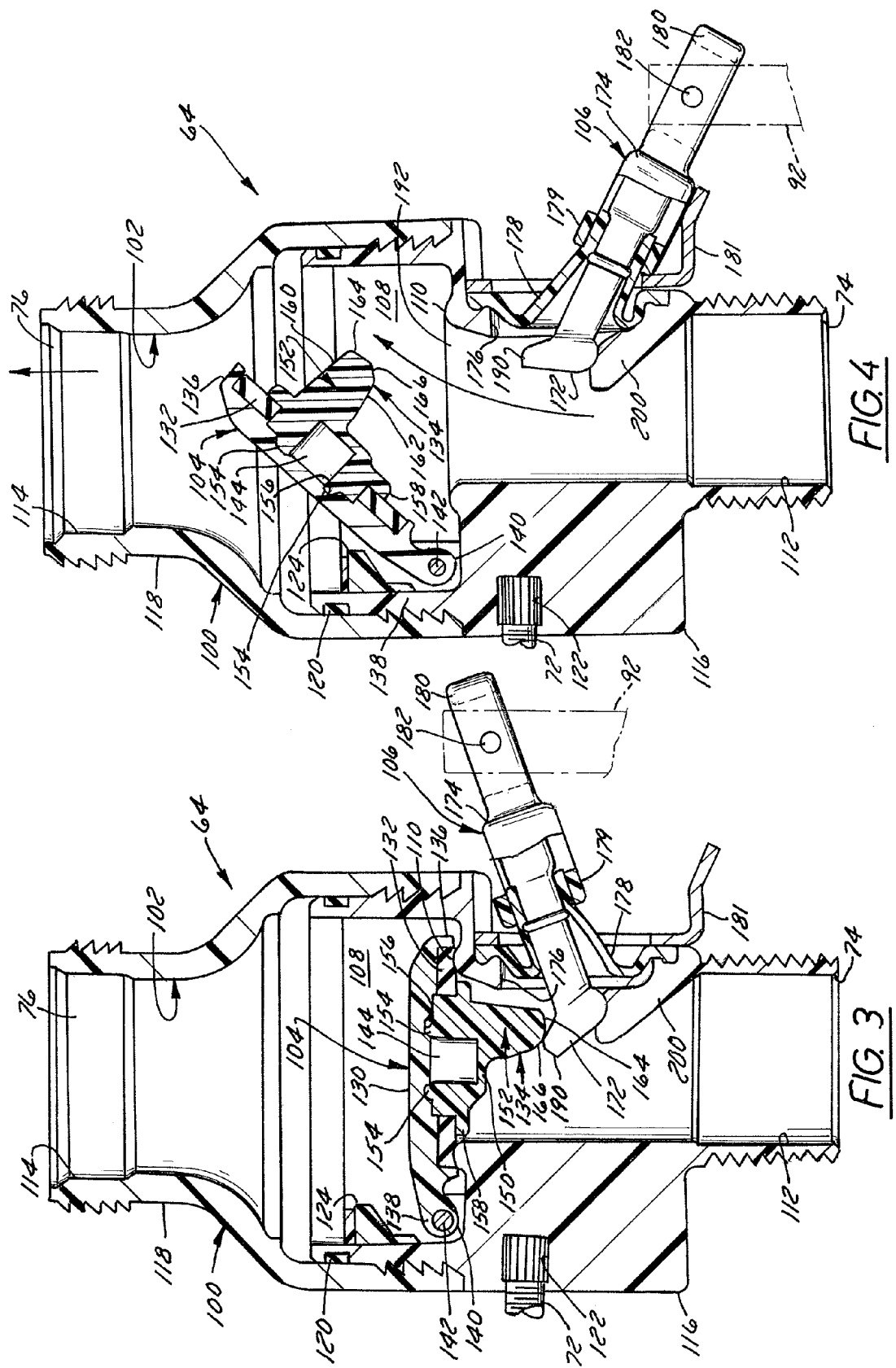

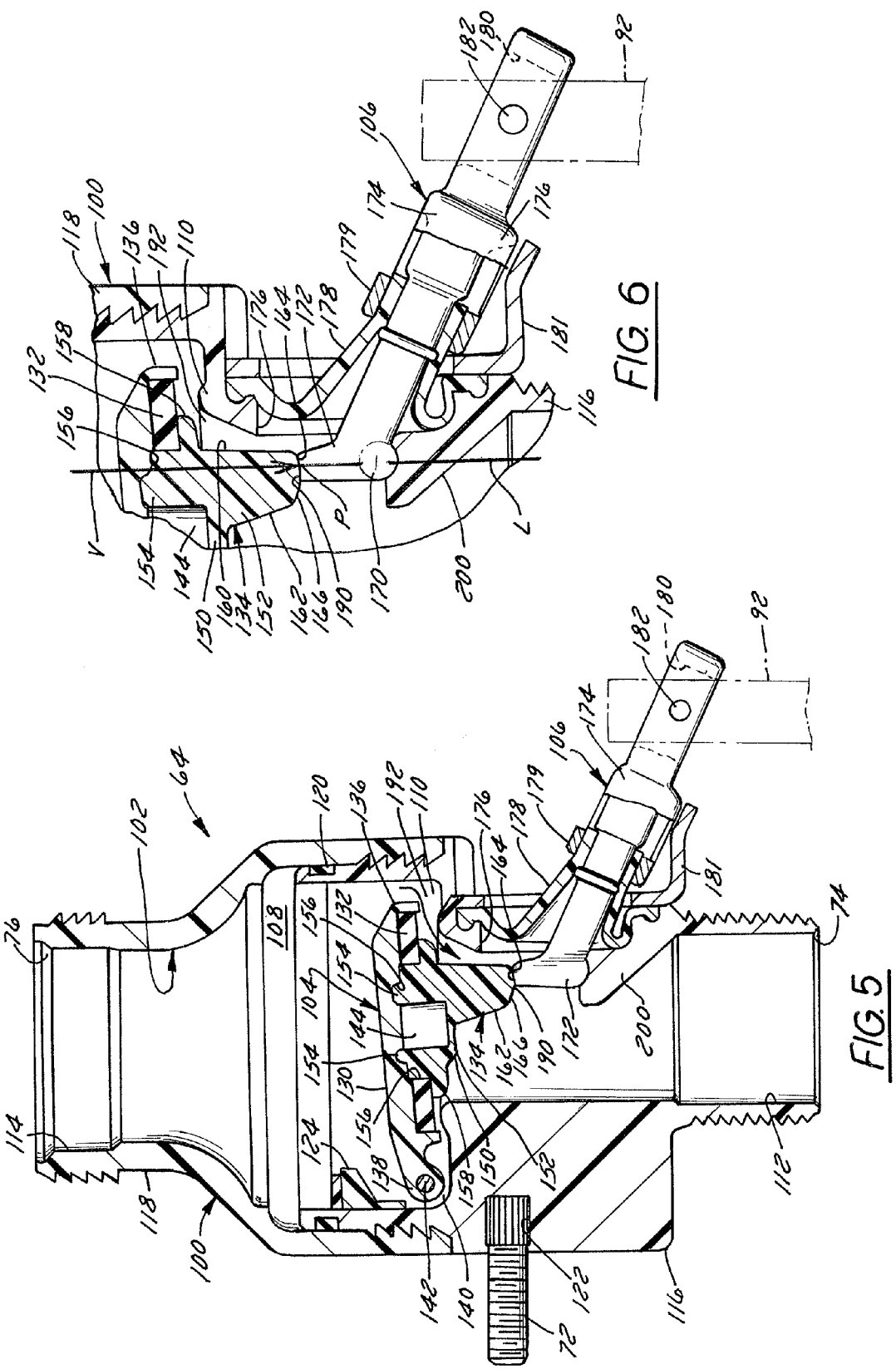

FLOAT-RESPONSIVE VALVE WITH PREMATURE CLOSURE PREVENTION

CROSS REFERENCE TO RELATED APPLICATION

This application claims priority under 35 U.S.C. §119(e) to U.S. provisional application Ser. No. 60/456,126, filed on Mar. 19, 2003, and entitled "Float-Responsive Valve with Premature Closure Prevention," the entirety of which is incorporated herein by reference.

BACKGROUND OF THE INVENTION

1. Field of the Invention

The invention relates to valves and, more particularly, relates to a valve that is openable by a float and that remains open against closing forces generated by fluid flow through the valve. The invention additionally relates to a brine valve having these characteristics, a water softener incorporating a brine valve having these characteristics, and/or a method of operating a valve having these characteristics.

2. Discussion of the Related Art

Float-responsive valves are used in a variety of applications in which a float-responsive valve actuator holds a valve element of the valve in its open position against closing forces imposed on the valve element by fluid flowing through the valve. One example, but by no means the only possible example, is a so-called "brine valve" of a water softener. Water softeners are widely used for removing calcium and other deposit-causing materials from so-called "hard water." The typical water softener relies on an ion exchange process taking place in an ion-exchange resin bed stored in a resin tank of the water softener. As the water to be processed passes through the resin-filled tank, ions of calcium and other minerals in the water are exchanged with ions found in the resin, e.g., sodium or potassium, thereby removing objectionable ions from the water and exchanging them for less objectionable ions from the resin.

The capacity of the resin to exchange ions or otherwise treat the water is finite and is reduced during the ion exchange process. If measures are not taken to regenerate the resin by replacing the undesirable ions with desirable ions, the ion exchange capacity of the resin will become exhausted. Water softeners are typically configured to periodically regenerate the ion exchange resin stored in the resin tank. Regeneration typically involves chemically replacing the objectionable ions such as calcium ions from the resin with less objectionable ions such as sodium ions. This replacement is typically performed by introducing a regenerant solution of sodium chloride or potassium chloride into the resin bed from a brine tank and thereafter flushing the spent regenerant solution from the bed. The solution is formed during a "fill" phase of the regeneration cycle by directing fresh water into the brine tank from a control valve on the resin tank, where the water contacts and dissolves the salt or the like from a regenerating agent in the tank to form the solution. Regneration of the ion exchange resin takes place during and following a "draw" phase of the regeneration cycle when the solution is transferred from the brine tank, through the control valve, and into the resin tank.

Fluid flow between the control valve and the brine tank of a typical water softener is controlled by a brine valve located in the brine tank and capable of selectively shutting off a flow passage through which fluid flows to and from the brine tank. The brine valve typically is located at the top of a vertical tube or "riser" in the brine tank and is coupled to a float that rises and falls with liquid levels in the brine tank. The typical brine valve includes a poppet, flapper or other valve element that selectively (1) seals against a seat to prevent flow through the valve and (2) moves away from the seat to permit flow through the valve. The valve element can be opened either by downward movement of the float or by suction forces within the riser. For example, during the draw phase of the regeneration cycle, liquid is drawn upwardly through the riser under suction force to force the valve element open and draw liquid from the bottom of the brine tank, through the valve, and to the resin tank. Conversely, during the fill phase, a valve actuator holds the valve element in its open position, and fluid flows downwardly through the valve to fill the brine tank to the desired level. If the liquid rises to sufficient height to lift the float to its raised position, the float moves the valve actuator to a position closing the valve. (In some situations, the float acts directly on a poppet without a valve actuator.) Flow-fill systems without timed refill or with relatively inaccurate timers rely on closure of the brine valve to determine the level of liquid in the brine tank. The brine valve functions as a primary shut-off valve in this type of system. A "timed brine" system relies at least in part on a timer to terminate the fill cycle. Fluid is supplied to the tank at a known flow rate, and the timer is set to shut off fluid flow simultaneously with the liquid level reaching the desired fill volume. Systems with relatively accurate timers will typically set the raised position of the float above the desired fluid level, in which case the timer is relied upon for primary shut-off and the fill phase usually terminates before the brine valve closes. The float responsive brine valve functions as a "safety float" or secondary shut-off valve in this type of system. In both types of systems, a float responsive valve actuator maintains the brine valve in its open position during the fill phase. It also closes the valve element at the end of a fill phase when the brine valve serves as a shut-off.

Fluid often flows into the brine valve from above very turbulently during the fill phase. The rapidly flowing turbulent fluid, often entraining a substantial volume of air, can impose relatively strong closing forces on top of the valve element. If these forces are strong enough, they can drive the valve actuator to prematurely lift the float, thereby forcing the valve element against the seat and preventing the flow of fluid into the brine tank. As a result, the fill cycle may end without the fluid level in the brine tank achieving its desired level. This is known as a "short fill" condition, which results in a "short salt" condition in the subsequent draw phase because insufficient solution is present in the tank to provide full ion exchange with the resin in the resin tank. Water softener performance therefore degrades.

The above problem can be avoided, at least to a large extent, by oversizing the float so it is exceedingly heavy and, therefore, is relatively insensitive to forces imposed on it by the valve actuator through the transmission of closing forces through the flapper. However, the heavier float still may be susceptible to premature brine valve closure during periods of unusually high velocity or unusually turbulent fluid flow through the brine valve during the fill phase.

The "short fill" problem can also be reduced by placing a diverter structure such as a baffle or cage above the valve element to reduce the impact forces imposed on the valve element by the incoming fluid stream. However, such diverters are only partially effective and may hinder valve operation during the draw phase of the regeneration cycle.

The need has additionally arisen to provide a float-responsive brine valve that is usable, e.g., in a water softener and that is relatively immune to closing forces imposed on the valve element of the valve by fluid flowing through it.

SUMMARY OF THE INVENTION

In accordance with a first aspect of the invention, a float-responsive valve is provided that includes a valve body that has a flow passage formed therein, the flow passage having first and second portions, a valve seat that is disposed in the flow passage between the first and second portions, a valve element, and a float-responsive valve actuator. The valve element is disposed in the flow passage and is movable between a closed position in which the valve element seats on the valve seat to prevent fluid flow through the flow passage and an open position in which the valve element unseats from the valve seat and permits fluid flow through the flow passage. The valve actuator is selectively responsive to operation of a float to move from a first position to a second position in which the valve actuator is positioned to hold the valve element in the open position thereof. The valve actuator is dimensioned and configured relative to the valve element such that, when the valve actuator is in the second position thereof, fluid pressure in the second portion of the flow passage is incapable of closing the valve element.

Preferably, the valve element comprises a poppet or a flapper that is movable between open and closed positions thereof. In the preferred embodiment, the valve element comprises a flapper having an upper surface facing the second portion of the flow passage and a lower surface facing the first portion of the flow passage. In this case, the valve actuator comprises an actuating lever that is pivotable about a pivot axis between the first and second positions thereof. The actuating lever and the flapper are configured such that, when the actuating lever is in the second position and the lower surface of the flapper is pressed against the actuating lever by closing forces imposes on the flapper by fluid flowing from the second portion toward the first portion, a force vector passes through a primary contact point between the actuating lever and the flapper at a substantially nonnegative angle relative to a bisecting line passing through the pivot axis and the primary contact point. The force vector and bisecting line are preferably at least substantially collinear.

A brine valve configured generally as configured above, a water softener employing such a brine valve, and a method of using such a valve are also disclosed.

Other aspects and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications could be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIG. 3 is a sectional side elevation view of the brine valve of FIGS. 1 and 2, illustrating the brine valve in a closed position;

FIG. 4 corresponds to FIG. 3 and illustrates the brine valve during a draw phase of a regeneration cycle;

FIG. 5 corresponds to FIG. 4 and illustrates the brine valve during a fill phase of the regeneration cycle; and FIG. 6 is a fragmentary enlarged view corresponding to FIG. 5 and illustrating the cooperating components of a valve actuator and a valve element of the brine valve of FIGS. 1-5.

DETAILED DESCRIPTION OF THE PREFERRED EMBODIMENTS

Figure 1:
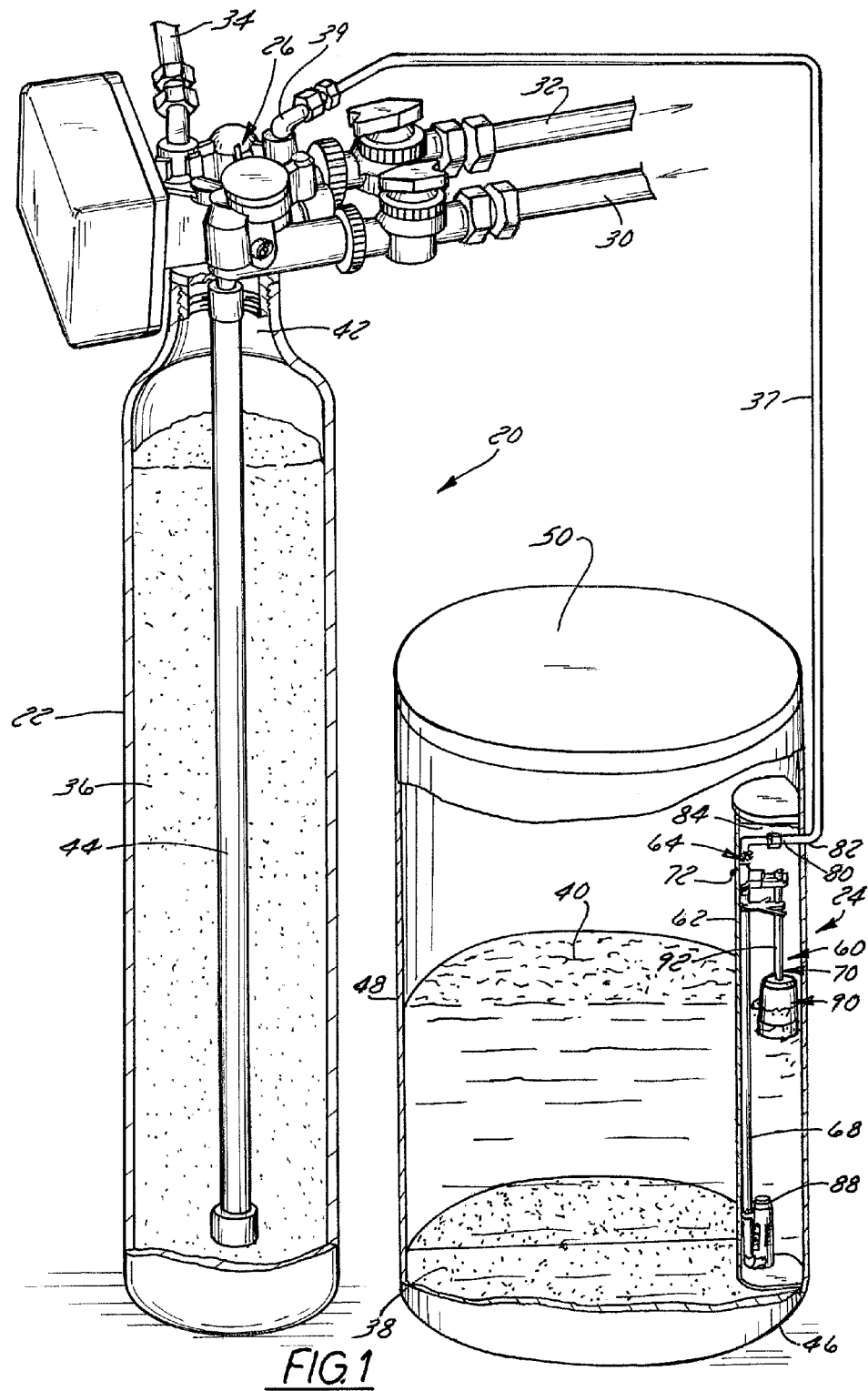
FIG. 1 is a partially cut away side elevation view of a water softener incorporating a brine valve constructed in accordance with a preferred embodiment of the present invention.

Before referring to the specific example illustrated in the drawings, it is to be understood that the invention is usable in conjunction with a variety of float-responsive valves having a valve element designed to remain open despite the imposition of closing forces on the valve element by fluid flowing through the valve. Hence, while the invention will now be described in conjunction with a water softener brine valve by way of non-limiting example, it is to be understood that it is applicable to a variety of valves other than brine valves and to valves used in applications other than water softeners as well.

Referring to the drawings and initially to FIG. 1, a water softener 20 is illustrated that employs a brine valve constructed in accordance with a preferred embodiment of the invention. The water softener 20 includes a resin tank 22, a brine tank 24, and a control valve 26 threaded onto the top of the resin tank 22. The control valve 26 is fluidically coupled to the resin tank 22, the brine tank 24, a line 30 leading to a source of untreated water, a treated water line 32, and a drain line 34. The resin tank 22 is filled with a treatment medium such as an ion exchange resin bed 36, and the brine tank 24 contains particles 38 of sodium chloride, potassium permanganate, or another suitable regeneration medium which can be dissolved by water to form a brine or regenerant solution 40. In operation, as incoming hard water enters the resin tank 22 through an opening 42 in the top of the resin tank 22, the water in the resin tank is forced through the resin bed 36 and out a distribution tube 44 extending through the center of the resin bed 36. The distribution tube does not necessarily need to extend through the center of the bed, in side mounted tanks there may be a pipe that enters through the side of the tank and terminates in a distributor. Untreated water flows through the side of the tank down through the bed and is collected by the bottom distributor and exits through the side of the tank. The capacity of the resin bed 36 to exchange ions with the minerals and impurities in the incoming hard water is finite, and depends on (1) the treatment capacity of the resin bed 36 as usually measured in grains or grams of hardness as $CaCO_3$ and (2) the hardness of the incoming water as typically measured in grains or grams of hardness as $CaCO_3$ per gallon or other unit of measurement. To regenerate the resin bed 36 once its treating capacity has been depleted, the resin bed 36 is flushed with the regenerant solution 40 from the brine tank 24 by directing a brine solution into the resin tank 22 from the brine tank 24 via a line 37 connecting an inlet outlet opening 82 in the brine tank 24 to a brine port 39 on the control valve 26. This flushing releases minerals and other impurities from the resin bed 36 and carries them out of the resin tank 22 through the control valve 26 when the solution is subsequently discharged to drain through line 34.

Still referring to FIG. 1, the brine tank 24 includes a plastic tank having a base 46, a tubular wall 48 extending upwardly from the base, and a lid 50 that selectively closes the upper end of the brine tank. A regenerating agent 38, such as sodium chloride, is housed within the tank, either by resting directly on the base 46 or on top of a platform or so-called "salt grid" (not shown) separating the regenerating agent 38 from the base 46. A float-responsive brine valve assembly 60 is housed in a compartment or "brine well" 62 that separates the brine valve assembly 60 from the remainder of the brine tank 24 so that the operative components of the brine valve assembly 60 contact only the liquid brine solution, not the solid particles of sodium chloride or other regenerating agent.

It should be emphasized at this point that the terms "brine" and "brine" valve are used only for convenience and should not be construed as an indication that even the disclosed brine valve assembly 60 is limited for use with a salt based water treatment system. The valve assembly 60 and the system as a whole could instead be used with any regenerating agent.

Figure 2:
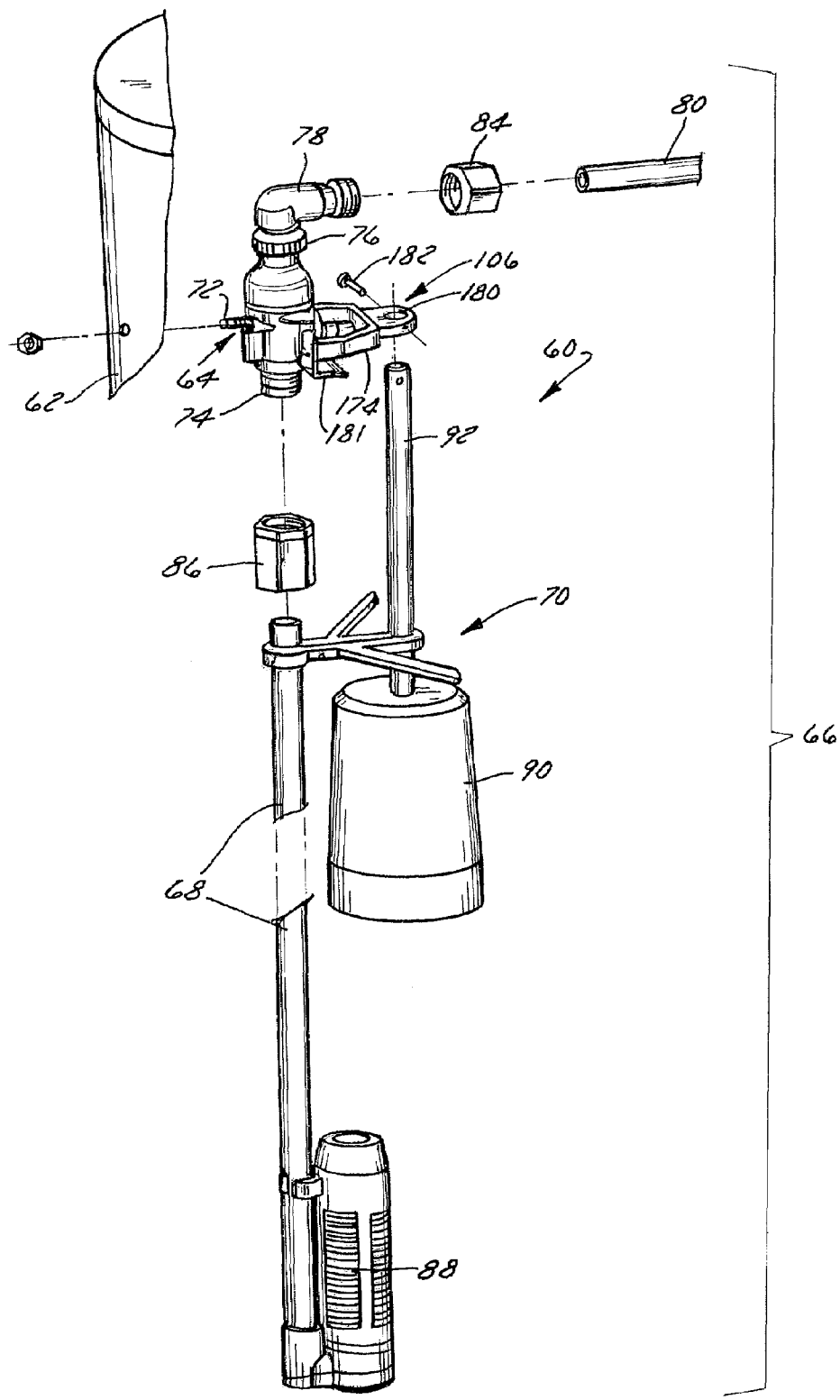
FIG. 2 is an exploded perspective view of the brine valve of FIG. 1 and of related components of the water softener brine tank.

Referring to FIGS. 1 and 2, the brine valve assembly 60 comprises a brine valve 64, an inlet/outlet tube assembly 66, a riser pipe 68, and a float 70. The brine valve 64, described in detail below, is attached to the side of the brine well 62 by a fastener 72 and is oriented so as to present a lower port 74 and an upper port 76. It may alternatively be mounted on the sidewall 48 of the brine tank 24. The inlet/outlet tube assembly 66 includes an elbow 78 connected to the upper port 76 of the brine valve 64, a tube 80 extending through an inlet/outlet opening 82 (FIG. 1) in the wall 48 of the brine tank 24, and a suitable fitting arrangement 84 connecting the tube 80 to the elbow 78. The inlet/outlet opening may also be through the lid 50. The riser pipe 68 comprises a hollow tube extending downwardly from the bottom port 74 on the brine valve 64 to the lower of the brine tank 24. The upper end of the riser pipe 68 is connected to the bottom port 74 of the brine valve 64 by a suitable fitting 86. The bottom end of the riser pipe 68 supports a conventional air check device 88 serving as an inlet/outlet of the brine valve assembly 60.

The float 70 is disposed in the brine well 62 adjacent the riser pipe 68. The float 70 comprises a float ball 90 and a float ball rod 92. The float ball 90 is buoyant so as to rise and fall with liquid levels in the brine tank 24. The float ball rod 92 extends generally vertically through the brine well 62 from a lower end attached to the float ball 90 to an upper end attached to a valve actuator 106 of the brine valve as detailed below. Due to this arrangement, when the fluid level in the brine tank 24 drops below a desired level, the float 70 drops from the raised position illustrated in FIG. 1 to a lower position, thereby pivoting the valve actuator 106 from its first position to its second position, both discussed in more detail below. In a system in which the brine valve 64 acts as the primary shut-off, the raised position of the float 70 is positioned at the same height as the desired level of liquid in the brine tank 24. Conversely, in a "safety float" system in which the brine valve acts 64 as a secondary shut-off, the raised position of the float 70 is usually above the desired level of the liquid in the tank, and the liquid level is determined primarily by operation of a timer in the control valve 26.

As a result of this arrangement, during the fill phase of the regeneration cycle, water flows into the inlet/outlet opening 82 in the side wall 48 of the brine tank 24 from the line 37 and the port 39, and then flows through the inlet/outlet tube assembly 66, through the open brine valve 64, downwardly through the riser pipe 68, outwardly through the air check device 88, out of the brine well 62 and into the interior of the brine tank 24. Conversely, during a draw phase of the cycle, the regenerant solution is drawn from the interior of the brine tank 24 into the brine well 62 through the air check device 88 into the bottom of the riser pipe 68, flows upwardly through the riser pipe 68, through the open brine valve 64 and the inlet/outlet tube assembly 66, out of the inlet/outlet opening 82 in the brine tank 24, and then into the control valve 26 via the line 37 and the port 39.

Referring now to FIGS. 3-6, the brine valve 64 includes a valve body 100 having a flow passage 102 formed generally vertically therethrough and connecting the lower and upper ports 74 and 76 to one another. It additionally includes a valve element 104 and a valve actuator 106 that are both mounted on the valve body 100 and that cooperate with one another to selectively prevent and permit fluid flow through the flow passage 102. The valve body 100, valve element 104, and valve actuator 106 will now be discussed in turn.

Still referring to FIGS. 3-6, the valve body 100 takes the form of an injection molded or blow molded plastic body through which the flow passage 102 extends. Alternatively the valve body may be formed by a different method such as machining the plastic or the valve body may be made out of a material other than plastic. The flow passage 102 is stepped so as to form a relatively large chamber 108 at a central portion thereof that houses the valve element 104. A valve seat 110 is disposed at the bottom of the chamber 108 to define a first, lower flow passage portion 112 beneath the valve seat 110 and second, upper flow passage portion 114 above the valve seat 110. In the illustrated embodiment, the valve body 100 comprises a two-part structure having lower and upper sections 116 and 118. The lower section 116 is externally threaded at its lower end to from the connection point for the riser pipe 68 and is externally threaded at its upper end. The upper section 118 is externally threaded at its upper end to present a connection point for the inlet/outlet tube assembly 66 and is internally threaded at its lower end. The threaded upper end of the lower section 116 can be threaded to the lower end of the upper section 118 and sealed to the upper section 118 by a ring seal 120. Alternatively, the lower section could be bonded or otherwise affixed to the upper section. A bore 122 is formed horizontally into the outer wall of lower section 116 for receiving the fastener 72 for attaching the brine valve 64 to the wall of the brine well 68. The aforementioned chamber 108 is formed in the upper end of the lower section 116. A stop 124 is mounted on or formed integrally with the inner surface of the rear wall portion of the lower section 116 at the upper end of the chamber 108 for limiting the opening movement of the valve element 104 as seen in FIG. 4. The valve seat 110 is formed in the bottom of the chamber 108 by a lip that protrudes upwardly from the uppermost end of the lower portion 112 of the flow passage 102. Flow through the brine valve 64 is prevented when the valve element 104 seals against the seat 110 as illustrated in FIG. 3. Flow in either direction is permitted when the valve element 104 moves away from the seat 110 to the position illustrated in FIG. 4 or to the position illustrated in FIGS. 5 and 6, both detailed below.

Generally speaking, the valve element 104 and valve actuator 106 may comprise any structures that suitably (1) cooperate with one another in response to downward movement of the float 70 relative to the brine valve 64 to open the brine valve 64, (2) permit the brine valve 64 to open in response to suction and upward fluid flow during a draw phase of the regeneration cycle (see FIG. 4), (3) hold the brine valve 64 open during the fill phase of the regeneration cycle (see FIGS. 5 and 6), and (4) permit the brine valve to close when the float 70 is raised and fluid is not being drawn upwardly through the brine valve 64 (see FIG. 3). The valve element 104 may, for instance, comprise a poppet. Valve element 104 comprises a flapper in the illustrated embodiment, and valve actuator 106 comprises an actuating lever. The flapper 104 and actuating lever 106 are both pivotally mounted on the valve body 100. The flapper 104, the actuating lever 106, and their interaction, will now be described in turn.

The flapper 104 comprises a generally flat plate 130, a seal 132, and a driven lug 134. The seal 132 and lug 134 are mounted on a bottom surface of the plate 130. The plate 130 may be formed from a relatively rigid rubber, an injection molded plastic material, or any other material that has sufficient structural integrity and rigidity to support the remaining components during pivotal motion of the flapper as a whole and resists deformation due to pressure forces. It also preferably has a metal weight 144 inserted into it to help it to close under its own weight during valve closure, but this effect may be supplemented by a relatively weak return spring (not shown). The plate 130 includes a circular body 136 having a diameter larger than that of the valve seat 110 and a clevis 138 that extends rearwardly beyond the rear end of the body 136. The clevis 138 is hinged to a corresponding ear mount 140 on the valve body 100 by a pivot pin 142. The pin 142 preferably provides a relatively loose fit to minimize resistance to flapper swinging and maximize the ability of the flapper 104 to seal against the valve seat 110 upon valve closure. Alternatively, the pin and ear mount combination could be replaced by a vertical pin or a pair of opposed pegs that float in a slot in the valve body 100 so as to permit limited vertical movement of the entire flapper 104.

The seal 132 comprises an elastomeric ring mounted in an undercut in the bottom of the flapper plate body 136. The seal 132 is dimensioned and positioned such that it seals against the valve seat 110 when the flapper 104 is in the closed position of FIG. 3. The seal 132 is retained in the undercut, e.g., by gluing and/or by being camped in place by the driven lug 134 as detailed below.

The driven lug 134 may be formed integrally with the flapper 104. However, in the illustrated embodiment, it is mounted on the bottom of the flapper plate body 130 and extends downwardly therefrom. As best seen in FIG. 6, it includes a circular mounting portion 150 and an abutment portion 152 positioned near the front end of the mounting portion 150. The mounting portion 150 includes an alignment pair of upwardly extending feet 154 that extend into corresponding recesses 156 in the bottom of the plate 130 adjacent front and rear portions of the inner diameter of the seal 132. The feet 154 are glued or otherwise fixed into the recesses 156. An annular shoulder 158 extends radially beyond the outer perimeter of the remainder of the mounting portion 150 to define an annular groove that receives the radial inner end portion of the seal 132 and helps clamp the seal 132 in place against the bottom surface of the plate 130.

The abutment portion 152 of the driven lug 134 extends downwardly from the mounting portion 150 by a distance sufficient for its bottom end to be contacted by the actuating lever 106 when the actuating lever pivots into its second position. As best seen in FIG. 6, the abutment portion 152 has front and rear surfaces 160, 162, a relatively flat lower engagement surface 164, and an inclined surface 166 extending rearwardly and upwardly from the rear end of the engagement surface 164 to the rear surface 162. The inclined surface 166, which forms the leading edge of the driven lug 134 during a valve opening operation, acts as a cam to reduce downward acceleration of the flapper 104 as the actuating lever 106 swings to its first position, preventing the flapper 104 from slamming shut and potentially bouncing. It also prevents over-acceleration of the actuating lever 106 and, accordingly, reduces stresses on the actuating lever 106 during valve closure. The inclined surface 166 also acts as a ramp that reduces the actuating forces required to lift the flapper 104 from valve seat 110 upon initial contact between the actuating lever 106 and the driven lug 134.

The actuating lever 106 is configured to pivot relative to the valve body 100 from a first position in which it is incapable of driving the flapper 104 away from the valve seat 110 to a second position in which it holds the flapper 104 away from the valve seat 110 in the valve opened position of FIGS. 5 and 6. Towards this end, the actuating lever 106 illustrated in the preferred embodiment includes a generally L-shaped lever mounted on the valve body 100 so as to pivot about a pivot axis 170 seen in FIG. 6. The actuation lever 106 includes a generally upwardly extending lobe 172 configured to contact the driven lug 134 on the flapper 104 and a lever arm 174. The lever arm 174 extends forwardly from the lobe 172 through an opening 176 in the valve body 100 for connection to the float ball rod 92. The lever arm 174 is guided and held against the valve body 100 by a gasket 178 surrounding the inner end of the lever arm 174 and fixed to a the lever arm 174 by a retaining ring 179. The gasket 178 is held to the valve body 100 by a gasket retainer plate 181 that prevents the gasket 178 from pulling out of the valve body. The gasket retainer plate 181 may be steel or some other material. It also prevents the lobe 172 of the lever arm 174 from swinging past the lobe 134 on the flapper and locking the lever arm 174 in its lowered or first position. The outer end of the lever arm 174 terminates in another retaining ring 180. The retaining ring 180 is pivotally attached to the float ball rod 92 by a pin 182. Although the system as thus far described requires lever arm movement to open the valve element 104, the invention is also applicable to systems having limited fill capabilities, in which case the system would have a gentler ramp on the actuator and a heavier float in order to permit the valve element to open under sufficiently high pressure.

The lobe 172 extends generally upwardly from the lever arm 174 to terminate in an upper engagement surface 190. The flapper 104 and actuating lever 106 are configured and dimensioned such that the engagement surface 190 of the lobe 172 is movable from 1) a first position, seen in FIG. 3, in which the engagement surface 190 is moved out of driving engagement with the driven lug 134 on the flapper 104 and 2) a second position, illustrated in FIGS. 5 and 6, in which lobe 172 is positioned so as to prevent the flapper 104 from closing. When the flapper 104 engages the lobe 172, the engagement surface 190 rests against the corresponding engagement surface 164 on the abutment portion 152 of the driven lug 174. At that time, the lobe 172 supports the flapper 104 at the valve open position in which a flow passage 192 is formed between the flapper 104 and the valve seat 110, hence permitting fluid to flow from the second upper passage 114 through 192 to the first lower passage 112 during a fill phase of a regeneration cycle. The leading edge of the upper end of the lobe 172, seen to the right in the drawings, may be inclined to form a ramp (not shown) that corresponds to the inclined surface 166 on the leading edge of the abutment portion 162 of the driven lug 134 to accentuate the acceleration damping described above in connection with the driven lug 134.

The mating engagement surfaces 164 and 190 define a line contact between the lobe 172 and the driven lug 134. The center of this line of contact defines a primary contact point P through which a force vector V passes when fluid flow from the upper portion 114 of the flow passage 102 toward the first portion 112 imposes a closing force on the flapper 104 as seen in FIG. 6. The direction of this force vector V relative to the vertical is dependent upon 1) the inclination of line of contact relative to the horizontal and, 2) the effective angle of the flapper 104 relative to the horizontal.

As indicated above, the actuating lever 106 is mounted on the valve body 100 so as to pivot about an axis 170, as shown in FIG. 6. This pivoting motion may come by way of a pivot pin. In the illustrated embodiment, however, this pivoting motion is accommodated by providing the actuating lever 106 with a bottom arcuate surface that rests on a mating arcuate surface of a cradle 200 mounted on or formed integrally with the lower section 116 of the valve body 100. The cradle 200 permits forces imposed on the actuating lever 106 by the flapper 104 to be transmitted to the body 100 primarily through the cradle 200 rather than through the cantilevered actuating lever 106, hence preventing actuating lever bending or breakage.

The location of the pivot axis 170 relative to the primary contact point P is critical to this embodiment of the invention. That is, the brine valve 64 as a whole must be configured such that the above-described force vector V forms a "substantially nonnegative angle" relative to a bisecting line "L" passing through the pivot axis 170 and the primary contact point P. "Substantially nonnegative" as used herein means that the force vector V and the bisecting line L are either 1) collinear, 2) diverge at a positive angle so that forces transmitted along the vector V tend to drive the actuating lever 106 beyond its actuating position or clockwise as seen in the drawings, or 3) diverge at no more than a relatively small negative angle so that forces transmitted along the vector V tend to pivot the actuating lever 106 counterclockwise towards its first position, but have a closing force component that is so small that they cannot overcome the opening forces of even the smallest float used in this type of system. Depending on cam geometry, float weight, and other facts, a substantially nonnegative angle should be no more than about 15°, and preferably no more than about 5°. A more negative angle, on the other hand, would cause closing forces imposed on the flapper 104 to have a higher tendency to pivot the actuating lever 106 counterclockwise and close the brine valve 64—which is unacceptable to this embodiment. By configuring the brine valve 64 such that the angle between the force vector V and the bisecting line L is at least substantially nonnegative, closing forces imposed on the flapper 104 either have a neutral effect on the actuator lever operation or actually tend to force the actuating lever 106 towards its second position. The nonnegative angle preferably is about zero so that the force vector V and bisecting line L are at least substantially collinear, thereby assuring that the closing forces have no effect on brine valve operation.

In operation of the water softener 20, water normally flows into the control valve 26 from the untreated water inlet 30, then into the resin tank 22 for treatment, then back through the valve 26 and out of the water softener via the treated water outlet 32. During a regeneration cycle, water is conveyed between the resin tank 22, the brine tank 24, and drain 34 as is well known in the art. Between draw and fill phases of this cycle, in which fluid does not flow either into or out of the brine tank 24, the brine valve 64 will normally take either the position of FIGS. 5 and 6 if the brine valve is a secondary shut-off valve or the position of FIG. 3 if the brine valve 64 is a primary shut-off valve. Assuming for the moment that the brine valve 64 is a primary shut-off valve, the float 70 is held by liquid in the tank 24 to its raised position to pivot the actuating lever 106 to the position seen in FIG. 3 at this time. The engagement surface 190 of the lobe 174 therefore is out of engagement with the corresponding engagement surface 164 of the driven lug 134. The seal 132 on the bottom of the flapper 104 therefore rests against the valve seat 110 to close the brine valve 64.

During a draw phase, suction is created at the inlet/outlet opening 82 of the brine tank 24 to draw water upwardly from a bottom opening in the brine well (not shown), through the air check device 88, through the bottom opening in the riser pipe 68, through the brine valve 64, through the inlet/outlet tube assembly 66, through the inlet/outlet opening 82, and into the control valve 26 via the line 37 and the port 39. The resultant suction forces move the flapper 104 from its closed position, through an open position, and to the fully opened position seen in FIG. 4 in which the flapper 104 rests against the stop 124. The flapper 104 retains this position whether or not the water level in the brine tank has dropped sufficiently to permit the float 70 to drop from its raised position.

Upon completion of the draw phase and consequent loss of suction and upward fluid flow, the flapper 104 pivots downwardly under the force of its own weight and possibly with the assistance of a weak return spring (not shown), if a return spring is provided. Assuming that the fluid level in the brine tank 24 is sufficiently low to drop the float beneath its raised position and that the actuator lever 106 therefore assumes its second position of FIGS. 5 and 6 (as is typically the case in a system in which the brine valve is used as a secondary-shut off), the flapper 104 does not fully close at this time. It instead drops into the position, seen in FIGS. 5 and 6, in which the engagement surface 164 of the driven lug on the flapper 104 and the engagement surface 190 of the lobe 172 on the actuating lever 106 engage one another and the actuating lever 106 holds the flapper 104 in its open position. If, on the other hand, the water level in the brine tank 24 is sufficiently high to lift the float 70 to its raised position and the actuating lever 106 therefore assumes the first position, the flapper 104 pivots into its closed position of FIG. 3.

The fill phase of the cycle is designed to take place only during periods in which the liquid level in the brine tank 24 is beneath the level that will hold the float 70 in its raised position. During the fill phase of the cycle, water, usually containing a substantial amount of air, flows turbulently into the inlet/outlet opening 82 of the brine tank 24 from the line 37 and the port 39 on the control valve 26, through the inlet/outlet tube assembly 66, and into the upper port 76 of the brine valve 64. The water then flows through the flow passage 102, out of the bottom port 74 of the brine valve 64, downwardly through the riser pipe 68, out of the bottom opening in the riser pipe 68, through the air check device 88, and into the interior of the brine tank 24. The brine valve 64 is held open at this time by the actuating lever 106, which may have remained in its second position since the last draw cycle or may have moved into its second position to open the brine valve 64 since completion of the last draw cycle. The turbulent flow of fluid through the brine valve 64 imposes variable-magnitude closing forces on the flapper 104 that tend to force the flapper 104 towards the valve seat 110. As discussed above, these forces are transmitted through a force vector V that forms a substantially nonnegative angle, preferably an angle of about zero, between it and the bisecting line L passing through the pivot axis 170 and the central contact point P. As discussed above, these downward forces therefore can have no appreciable effect to prematurely close the brine valve 64, thus negating the need to employ an oversized float or a diverting structure to keep the brine valve 64 open during the fill phase.

When the water level rises to a desired level to lift the float 70 back to its raised position, the actuating lever 106 swings counterclockwise as seen in the drawings from its second position seen in FIGS. 5 and 6 to its first position seen in FIG. 3. As discussed above, the inclined cam or ramp surface 166 on the leading edge of the driven lug 134 assures relatively low acceleration of the flapper 104 and prevents the flapper 104 from slamming against the valve seat 110 and bouncing. It also reduces water hammer.

Depending upon the design and status of the system, the brine valve 64 may close in response to lifting of the float 70 to its raised prior to initiation of the fill cycle, in which case it will be necessary to reopen the brine valve 64 before the next fill phase. In this case, during the next regeneration cycle suction first lifts the flapper to allow fluid to be removed from the tank. As the float 70 drops beneath its raised position, the actuating lever 106 pivots clockwise from its first position seen in FIG. 3 to the second position seen in FIGS. 5 and 6 to hold the flapper 104 further into the open position seen in FIGS. 5 and 6. During this motion, the leading edge on the lobe 172 may first engage the inclined leading edge 166 on the driven lug 134 to smoothly lift the flapper 104 away from the valve seat 110 with relatively low acceleration. Suction may also lift the flapper to a fully open position. The engagement surface 190 on the lobe 172 thereafter rests against the corresponding engagement surface 164 on the driven lug 134 along a line having a primary contact point as described above.

Many changes and modifications may be made to the invention without departing from the spirit thereof. The scope of some of these changes can be appreciated by comparing the various embodiments as described above. The scope of the remaining changes will become apparent from the appended claims.

The invention claimed is:

1. A float-responsive valve comprising:
   (A) a valve body that has a flow passage formed therein, said flow passage having first and second portions;
   (B) a valve seat that is disposed in the flow passage between said first and second portions;
   (C) a valve element that is disposed in said flow passage and that is movable between a closed position in which said valve element seats on said valve seat to prevent fluid flow through said flow passage and an open position in which said valve element unseats from said valve seat and permit fluid flow through said flow passage; and
   (D) a float-responsive valve actuator that is selectively responsive to operation of a float to move from a first position to a second position in which said valve actuator holds said valve element in said open position thereof, wherein said valve actuator is dimensioned and configured relative to said valve element such that, when said valve actuator is in said second position thereof, fluid pressure in said second portion of said flow passage is incapable of closing said valve element.

2. The float-responsive valve as recited in claim 1, wherein said valve element comprises one of a poppet and a flapper.

3. The float responsive valve as recited in claim 2, wherein said valve element comprises a flapper that is pivotable between open and closed positions thereof, said flapper having an upper surface facing said second portion of said flow passage and a lower surface facing said first portion of said flow passage, wherein
   said valve actuator comprises an actuating lever that is pivotable about a pivot axis between first and second positions thereof, wherein
   said actuating lever and said flapper are configured such that, when said actuating lever is in said second position and said lower surface of said flapper is pressed against said actuating lever by closing forces imposes on said flapper by fluid flowing from said second portion toward said first portion, a force vector passes through a primary contact point between said actuating lever and said flapper at a substantially nonnegative angle relative to a bisecting line passing through said pivot axis and said primary contact point.

4. The float-responsive valve as recited in claim 3, wherein said actuating lever has a lobe thereon that at least selectively engages a driven lug on said lower surface of said flapper at said primary contact point.

5. The float-responsive valve as recited in claim 4, wherein said actuating lever is generally L-shaped and has a first leg formed by said lobe, a second leg extending at least generally perpendicularly from said first leg and out of said valve body for attachment to a float, and a pivot mount located a juncture between said first and second legs.

6. The float responsive valve as recited in claim 4, wherein said actuating lever is supported on said valve body at said pivot mount.

7. The float-responsive valve as recited in claim 4, wherein said driven lug extends downwardly from a relatively flat bottom surface of said flapper.

8. The float-responsive valve as recited in claim 7, wherein said driven lug is mounted in a segmented recess formed in said bottom surface of said flapper.

9. The float-responsive valve as recited in claim 5, wherein at least one of said lobe and said driven lug has an inclined leading edge that engages the other of said lobe and said driven lug upon initial contact therebetween.

10. The float-responsive valve as recited in claim 3, wherein said force vector and said bisecting line are at least substantially collinear.

11. The float-responsive valve as recited in claim 3, wherein said actuating lever maintains said flapper in said open position thereof when fluid flows through said flow passage from said second portion thereof to said first portion thereof, and wherein said flapper is moveable beyond said open position to a fully-open position under fluid pressure when fluid flows through said flow passage from said first portion thereof to said second portion thereof.

12. The float-responsive valve as recited in claim 1, wherein said valve actuator maintains said valve element in said open position thereof when fluid flows through said flow passage from said second portion thereof to said first portion thereof, and wherein said valve element is moveable beyond said open position to a fully-open position under fluid pressure when fluid flows through said flow passage from said first portion thereof to said second portion thereof.

13. The float-responsive valve as recited in claim 1, wherein said valve body includes first and second sections that are connected to one another and that have mating bores formed therethrough to collectively form said first and second portions of said flow passage.

14. The float-responsive valve as recited in claim 13, wherein said valve element is mounted in a chamber formed by an enlarged end portion of the bore in said first section, said enlarged end portion forming an inner end of said second portion of said flow passage.

15. The float-responsive valve as recited in claim 13, wherein said first and second valve body sections are attached to one another by one of a threaded connection and a bonded connection.

16. The float-responsive valve as recited in claim 13, wherein
said valve is a water softener brine valve configured to be mounted in a brine tank of a water softener,
said first portion of said flow passage terminates in a port configured to communicate with the interior of the brine tank, and
said second portion of said flow passage terminates in a port configured to communicate with the exterior of the brine tank.

17. A water softener brine valve comprising:
(A) a valve body that has a first port configured to communicate with an interior of a water softener brine tank, a second port configured to communicate with an exterior of the brine tank, and a flow passage connecting said first and second ports to one another;
(B) a valve seat that is disposed in said flow passage;
(C) a flapper that is pivotably mounted in said valve body and that is pivotable from a closed position thereof in which said flapper seats on said valve seat and an open position to permit fluid flow through said flow passage past said valve seat; and
(D) a float-responsive actuating lever that is selectively responsive to operation of a float to pivot about a pivot axis from a first position to a second position in which said actuating lever holds said flapper in said open position, wherein said actuating lever is dimensioned and configured relative to said flapper such that fluid flowing through said flow passage from said second port is incapable of closing said flapper when said actuating lever is in said second position thereof.

18. The brine valve as recited in claim 17, wherein said actuating lever and said flapper are configured such that, when said actuating lever is in said second position and said flapper is pressed against said actuating lever by closing forces imposes on said flapper by fluid flowing from said second port toward said first port, a force vector passes through a primary contact point between said actuating lever and said flapper at a substantially nonnegative angle relative to a bisecting line passing through said pivot axis and said primary contact point.

19. The brine valve as recited in claim 18, wherein said actuating lever has a lobe thereon that at least selectively engages a driven lug on a lower surface of said flapper at said primary contact point.

20. The brine valve as recited in claim 19, wherein at least one of said lobe and said driven lug has an inclined leading edge that engages the other of said lobe and said driven lug upon initial contact therebetween.

21. The brine valve as recited in claim 17, wherein said force vector and said bisecting line are at least substantially collinear.

22. A water softener comprising:
(A) a resin tank;
(B) a brine tank;
(C) a control valve assembly that is connected to said resin tank, said brine tank, a source of untreated water, a drain, and a treated water discharge and that is configured to control fluid flow between the source of untreated water, said resin tank, said brine tank, the treated water discharge, and the drain; and (D) a water softener brine valve comprising
(1) a valve body that has a first port in fluid communication with the interior of a water softener brine tank, a second port communicating with the control valve assembly via an inlet/outlet opening in said brine tank, and a flow passage connecting said first and second ports to one another,
(2) a valve seat that is disposed in said flow passage,
(3) a flapper that is pivotably mounted in said valve body and that is pivotable from a closed position thereof in which said flapper seats on said valve seat and an open position thereof to permit fluid flow through said flow passage past said valve seat, and
(4) a float that is disposed in said brine tank and that is configured to move between a raised position thereof and lowered position thereof as a liquid level in said brine tank rises and falls, and
(5) a float-responsive actuating lever that is coupled to said float and that is responsive to downward motion of said float from said raised position to pivot about a pivot axis from a first position in which said actuating lever is incapable of opening said flapper to a second position in which said actuating lever holds said flapper in said open position thereof wherein said actuating lever and said flapper are configured such that, when said actuating lever is in said second position and said flapper is pressed against said actuating lever by closing forces imposes on said flapper by fluid flowing through said flow passage from said second port, a force vector passes through a primary contact point between said actuating lever and said flapper, said force vector being at least generally collinear with a bisecting line passing through said pivot axis and said primary contact point.

23. The water softener as recited in claim 22, wherein said flapper is configured
to be held open by said actuating lever against the resistance of fluid forces flowing through said flow passage during a refill phase of a water softening cycle in which fluid flows through said flow passage from said second port to said first port,
to be held open by fluid pressure when fluid flows through said flow passage from said first port to said second port, and
to close automatically when said float is in said raised position and fluid is not flowing through said flow passage from said second port to said first port.

24. A method of operating a valve, comprising:
(A) moving a valve element into an open position thereof;
(B) in response to downward movement of a float from a raised position thereof to a lowered position thereof, moving a valve actuator from a first position thereof to a second position thereof in which said valve actuator holds said valve element in said open position thereof;
(C) imposing closing forces on an open valve element generated by fluid flowing past said valve element; and
(D) so long as said float remains in said lowered position and said closing forces are imposed on said valve element, transmitting said closing forces through said valve actuator in a manner that prevents said closing forces from driving said valve actuator from said second position thereof to said first position thereof, thereby holding said valve element in said open position despite the imposition of closing forces thereon.

25. The method as recited in claim 24, wherein said valve actuator comprises an actuating lever which engages said valve element, wherein the moving step comprises pivoting said actuating lever about a pivot axis such that said actuating lever engages said valve element at a primary contact point, and wherein the transmitting step comprises transmitting a force vector that forms a substantially nonnegative angle with a bisecting line passing through said primary contact point and said pivot axis.

26. The method as recited in claim 25, wherein said force vector and said bisecting line are at least substantially collinear.

27. The method as recited in claim 25, wherein said valve element comprises a flapper, and wherein the pivoting step comprises pivoting a lobe on said actuating lever into contact with a driven lug on said flapper.

28. The method as recited in claim 27, wherein the pivoting step comprises engages a leading edge on at least one of said lobe and said driven lug with the other of said lobe and said driven lug upon initial contact therebetween.

29. The method as recited in claim 24, wherein said valve actuator maintains said valve element in said open position thereof when fluid flows through said flow passage from a second portion thereof to a first portion thereof, and wherein said valve element is moveable beyond said open position to a fully-open position under fluid pressure when fluid flows through said flow passage from said first portion thereof to said second portion thereof.

* * * * *